United States Patent Office 3,257,468
Patented June 21, 1966

3,257,468
PRODUCTION OF ALIPHATIC ALCOHOLS
Frank H. Dickey, Seal Beach, Calif., and Donald R. Napier, Ponca City, Okla., assignors to Continental Oil Company, Ponca City, Okla., a corporation of Oklahoma
No Drawing. Filed Feb. 5, 1965, Ser. No. 430,724
11 Claims. (Cl. 260—632)

This application is a continuation-in-part of the copending application of the present inventors, entitled, "Production of Aliphatic Alcohols," Serial No. 18,836, filed March 31, 1960.

This invention relates to a method for the production of aliphatic alcohols and more particularly it relates to the production of such alcohols by a process involving the partial oxidation of a trialkylaluminum compound followed by hydrolysis of the resultant oxidized product.

Various methods have been proposed for the production of alcohols involving processes other than fermentation methods or the destructive distillation of wood. In one proposed method, a high molecular weight ketone is reacted with sodium or potassium acetylide to form the sodium or potassium derivative of a substituted ethinyl carbinol which product is then hydrolyzed to the thinyl carbinol. In another method, an aldehyde is reduced to the corresponding alcohol employing a secondary metallic alkoxide as the reducing agent. In another, it has been proposed that alcohols can be produced by a process involving the reaction of formaldehyde with a metal alkyl compound, such as a lithium, magnesium, or sodium alkyl compound. None of these proposed methods has been entirely satisfactory. In the process using sodium or potassium acetylide that compound is prepared by reacting acetylene with metallic sodium or potassium. Since these two metals are very reactive, they must be handled with extreme care. Somewhat more recently, it has been proposed that aliphatic alcohols can be produced by the partial oxidation of a trialkylaluminum compound to form an aluminum alkoxide which is then hydrolyzed to form the alcohol. The latter process as heretofore practiced has not been entirely satisfactory because of the formation of by-products and the resultant rather low yield of the desired alcohol.

It is, therefore, a primary object of the present invention to provide a process for the production of aliphatic alcohols which obviates the disadvantages of the prior art processes.

It is another object of the present invention to provide an improved process for the production of aliphatic alcohols.

It is another object of this invention to provide an economical and direct process for the manufacture of aliphatic alcohols involving a minimum of process steps and using moderate reaction conditions.

Further objects and advantages will become apparent from the following description.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principle of the invention may be employed.

Stated broadly, the present invention may be described as a process for the preparation of a primary aliphatic alcohol which comprises partially oxidizing a trialkylaluminum compound containing primary alkyl groups linked to the aluminum radical with molecular oxygen to form an aluminum alkoxide. The partial oxidation of the trialkylaluminum compound, particularly the later stages of that oxidation, is carried out in the presence of an aluminum alcoholate derived from a secondary alcohol, particularly, aluminum isopropoxide. The trialkylaluminum compounds included within the scope of this invention are those wherein the aluminum is bonded to a primary carbon atom, that is a carbon atom having attached thereto two hydrogen atoms. As in the prior art, the alcohol is obtained by the hydrolysis of the aluminum alkoxide. For example, triethylaluminum can be oxidized to aluminum ethoxide in the presence of aluminum isopropoxide and ethanol obtained by hydrolysis of the aluminum ethoxide. Similarly tripropylaluminum, tributylaluminum, tripentylaluminum, and trihexylaluminum can be oxidized in the presence of aluminum isopropoxide to the corresponding aluminum propoxide, aluminum butoxide, aluminum pentoxide, and aluminum hexoxide, and by hydrolysis the corresponding alcohols, propanol, butanol, pentanol, and hexanol, can be obtained.

Suitable trialkylaluminum compounds include such compounds wherein the carbon content of the alkyl radicals varies from 1 to 30 or even more. Specific compounds which can be employed, in addition to those previously listed, are triisobutylaluminum, trioctylaluminum, tri-(2-ethylhexyl)-aluminum, tridodecylaluminum, trioctadecylaluminum, ethylbutylhexylaluminum, and the like. Although theoretically there is no limit to the number of carbons in the alkyl radical that can be used, we generally prefer to employ a trialkylaluminum compound wherein the carbon content of alkyl radicals varies from 2 to 22. Obviously the alkyl radicals of the trialkylaluminum compound may be the same or different. As a rule, a compound wherein the alkyl radicals are the same is desired as the use of such a compound produces one alcohol. If, on the other hand, a compound is used wherein the alkyl radicals are different, a mixture of alcohols is formed. A specific compound that we have used very successfully in our process is trihexylaluminum. Methods for the preparation of this particular compound and other trialykylaluminum compounds are described in the literature and form no part of the present invention. In this regard, reference is made to U.S. Patents 2,781,410, 2,787,626, 2,826,598, 2,835,689, and British Patent 808,055.

As to the oxidizing agent, that may be air, enriched air, pure oxygen, etc.

We have found that the oxidation of the trialkylaluminum compound to the aluminum alkoxide is not quantitative; but certain by-products are also obtained, some in a relatively high yield. These by-products include aldehydes, esters, and hydrocarbons but are not limited to those only, as other by-products may be produced also. While we do not wish to be bound by any theory as to how these by-products are formed, we believe that the following is a correct explanation.

The oxidation of aluminum alkyls is believed to be a two-step process involving reactions of the type indicated by Equations 1 and 2.

(1) $\quad Al(R)_3 + O_2 \rightarrow Al(OOR)(R)_2$
(2) $\quad Al(OOR)(R)_2 + Al(R)_3 \rightarrow 2Al(OR)(R)_2$ Evidence supporting this mechanism has been published in the literature. In addition, the oxidation of other metalorganic compounds such as Grignards and boron alkyls involves reactions similar to (1) and (2).

The formation of aldehyde and hydrocarbon from the peroxide intermediate of Reaction 1, if the Al—O—O— radical is bonded to a primary carbon atom, can be explained by assuming that a portion of the peroxide intermediate undergoes thermal decomposition as indicated by the following reactions. In these reactions the

radical is the equivalent of the R radical of Reaction 1, R' being an alkyl radical. The R alkyl radicals of reaction (1) are not to be considered as all necessarily identical.

(3)

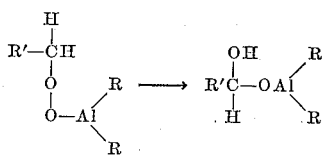

(4)

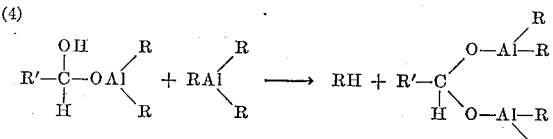

(5)

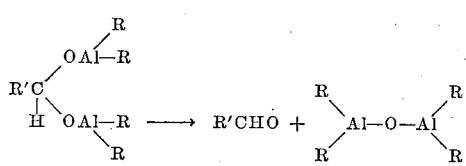

If the aldehyde of Reaction 5 is not removed, it will undergo a further reaction to yield an ester (Tischtschenko reaction) and unsaturated carbonyl containing-compounds (aldol condensation) giving, ultimately a complex mixture comprising an alcohol, ester, aldehyde, hydrocarbon, unsaturates, etc.

We have found that the presence of aluminum isopropoxide during the later stages of the oxidation reduces the amount of aldehydes, ketones and other by-products in the final product with a corresponding increase in the yield of the desired alcohol. We do not know why improved results are obtained by the use of aluminum isopropoxide; it may be that the isopropoxide chemically reduces some intermediate in the aldehyde forming process or the aldehyde itself. The important fact is that the isopropoxide must be present to effect the increased yield of alcohol. While we do not wish to be bound by any particular theory as to how our desirable results are attained, we believe that the following is substantially correct. The aluminum isopropoxide reacts with the aldehyde to form an alkoxide and acetone and the latter escapes further reaction because of its lower reactivity and volatility. This is shown in Equation 6 below.

(6)

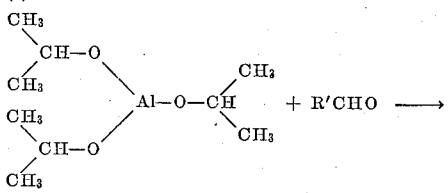

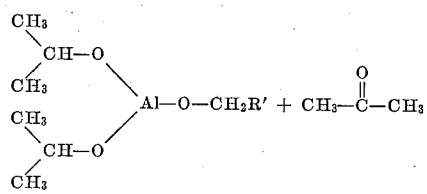

If the added alcoholate were derived from a primary alcohol, the only change occurring in this reaction would be the replacement of one aldehyde with another as shown in Equation 7.

(7)

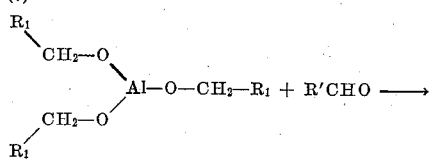

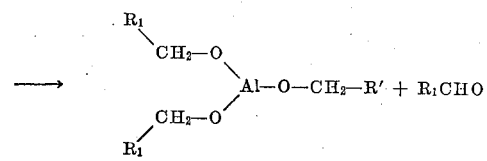

While alcoholates derived from almost any secondary alcohols would undergo these reactions shown in Equation 6 to yield a ketone, in practice the isopropyl alcoholate is much more effective. This is because the reactions are reversible and must compete with fast irreversible reactions such as the condensation of aldehyde to ester. Accordingly, it is important that the ketone product be rapidly removed from the reaction mixture which is more difficult with ketones of higher molecular weight. Aluminum isopropoxide is a better choice than, for example, aluminum secbutylate since the acetone, formed from aluminum isopropoxide, is volatile and easily removed.

As to the amount of aluminum isopropoxide used, that should be about two or three times the theoretical quantity required to react with the aldehyde formed. Based on the trialkylaluminum, the amount of isopropoxide can vary broadly from about 0.05 to about 0.5 mole per mole and preferably from about 0.1 to about 0.3 mole per mole.

We have found further that the aluminum isopropoxide should be added to the mixture at a time when no more than two-thirds of the trialkylaluminum compound has been oxidized. As a rule, we prefer to add the isopropoxide to the mixture when about one-half of the alkyl compound is oxidized.

In order to disclose the nature of the present invention still more clearly, the following illustrative examples will be given. It is to be understood that the invention is not to be limited to the specific conditions or details set forth in these examples except insofar as such limitations are specified in the appended claims.

*Example 1*

An excess of dry oxygen was bubbled through a solution comprising equal parts by volume (15 ml.) of trihexylaluminum and n-decane at 50° C.; at the end of the reaction analysis of the hydrolysis product showed: hexane 0.26%, hexaldehyde 0.69%, hexanol 93.54%, and hexyl hexanoate 3.55%.

*Example 2*

The procedure of Example 1 was followed with the exception that 0.2 mole of aluminum isopropoxide in 7 ml. of n-decane was added to the reaction mixture when approximately one-half of the trihexylaluminum oxidized. In this example, the temperature was maintained at approximately 55° C. At the end of the reaction analysis of the hydrolysis product showed: n-decane 1.88%, hexanol 95.66%, and hexyl hexanoate 0.01%.

*Example 3*

A solution comprising equal parts by volume (10 ml.) of trihexylaluminum and n-decane was treated with dry oxygen at 55–65° C. When approximately one-half of the trihexylaluminum was oxidized, 1.85 ml. of a solution consisting of 0.1 mole of aluminum isopropoxide in n-decane was added to the reaction mixture. At the end of the reaction, analysis of the reaction product showed that the combined yield of hexaldehyde and ester was 2.0%.

*Example 4*

Air at a rate of 148 ml./min. was passed through a solution comprising trihexylaluminum (9 ml.) and n-decane (20 ml.) at a temperature of 55–60° C. The yields of n-hexanol, in duplicate experiments, were 79.3 and 82.4%.

*Example 5*

The procedure of Example 4 was repeated with the exception that 0.2 mole of aluminum isopropoxide was added to the reaction mixture after two-thirds of the required oxygen had been consumed. The yields of n-hexanol, in duplicate experiments, were 85.6 and 85.7%. The yield of acetone based on the equivalents of trihexylaluminum used was 4.4 mole percent.

*Example 6*

In this example, 0.6 ml. of n-hexaldehyde was added to 20 ml. of a warm solution of aluminum hexoxide (48 weight percent) in n-decane. Immediately after mixing, a portion of the solution was withdrawn and hydrolyzed with 25% HCl. The hydrolysis product showed hexaldehyde 0.44%, hexanol 97.28%, and hexyl hexanoate 2.28%. The remaining solution was heated at 80–90° C. for one hour and then hydrolyzed. GLPC analysis showed no n-hexaldehyde, 95.75% hexanol, and 3.99% hexyl hexanoate. "GLPC" refers to gas-liquid partition chromatography.

The foregoing examples show definitely that improved yields of the desired alcohol will be produced if the oxidation reaction is carried out in the presence of aluminum isopropoxide. Examples 4 and 5 are particularly pertinent in this regard. Example 6 shows that, if the oxidation product is heated in the presence of an aldehyde, the result is a decrease in yield of the desired alcohol following hydrolysis of the mixture. This decrease in yield of alcohol is associated with an increase in yield of an ester.

The reaction can be carried out over a wide range of temperature, for example, from about 0 to about 100° C. Preferably, the temperature and pressure conditions of the reaction are maintained suitably to provide ready removal of the acetone which is formed during the reaction, i.e., at conditions above the boiling point of the acetone. A preferred temperature range is from about 50 to about 90° C.

While particular embodiments of the invention have been described, it will be understood, of course, that the invention is not limited thereto, since many modifications can be made, and it is therefore contemplated to cover by the appended claims any such modifications as fall within the true spirit and scope of the invention.

The invention having thus been described, what is claimed and desired to be secured by Letters Patent is:

1. A process for the preparation of a primary aliphatic alcohol from trialkylaluminum containing at least one primary alkyl group linked to the aluminum radical which comprises oxidizing the trialkylaluminum to aluminum alkoxide with molecular oxygen at a temperature which varies from 0 to 100° C. in the presence of aluminum isopropoxide, said isopropoxide being added when no more than about two-thirds of the trialkylaluminum has been oxidized, removing acetone from the oxidation product during the oxidizing of said trialkylaluminum in the presence of said aluminum isopropoxide, hydrolyzing the resultant product, and then recovering said alcohol.

2. The process of claim 1 wherein the alkyl groups of the trialkylaluminum compound contain from 1 to 22 carbon atoms.

3. The process of claim 1 wherein the alkyl groups of the trialkylaluminum compound contain from 2 to 12 carbon atoms.

4. The process of claim 1 wherein the oxidation is carried out at a temperature which varies from about 50 to about 90° C.

5. The process of claim 1 wherein the aluminum isopropoxide is added to the mixture at a time when no more than one half of the trialkylaluminum has been oxidized to aluminum alkoxide.

6. A process for the preparation of ethanol which comprises oxidizing triethylaluminum to aluminum ethoxide with molecular oxygen at a temperature which varies from 0 to 100° C. in the presence of aluminum isopropoxide, said isopropoxide being added when no more than two-thirds of the triethylaluminum has been oxidized, removing acetone from the oxidation product during the oxidizing of said triethylaluminum in the presence of said aluminum isopropoxide, hydrolyzing the resultant product, and then recovering said ethanol.

7. The process of claim 6 wherein the oxidation is carried out at a temperature which varies from about 50 to about 90° C.

8. The process of claim 6 wherein the amount of isopropoxide is between about 0.05 and about 0.5 mole per mole of triethylaluminum.

9. A process for the preparation of hexanol which comprises oxidizing trihexylaluminum to aluminum hexoxide with molecular oxygen at a temperature which varies from 0 to 100° C. in the presence of aluminum isopropoxide, said isopropoxide being added when no more than two-thirds of the trihexylaluminum has been oxidized, removing acetone from the oxidation product during the oxidizing of said trihexylaluminum in the presence of said aluminum isopropoxide, hydrolyzing the resultant product, and then recovering said hexanol.

10. The process of claim 9 wherein the oxidation is carried out at a temperature which varies from about 50 to about 90° C.

11. The process of claim 9 wherein the amount of isopropoxide is between about 0.05 and about 0.5 mole per mole of trihexylaluminum.

No references cited.

LEON ZITVER, *Primary Examiner*.